(12) United States Patent
Nahas et al.

(10) Patent No.: US 11,368,496 B2
(45) Date of Patent: Jun. 21, 2022

(54) AUTOMATIC NETWORK APPLICATION SECURITY POLICY EXPANSION

(71) Applicant: Zscaler, Inc., San Jose, CA (US)

(72) Inventors: Peter Nahas, Watertown, MA (US);
Peter Smith, Acton, MA (US); Harry Sverdlove, North Reading, MA (US);
John O'Neil, Watertown, MA (US);
Scott Laplante, Bedford, NH (US);
Andriy Kochura, North Andover, MA (US)

(73) Assignee: Zscaler, Inc., San Jose, CA (US)

( * ) Notice: Subject to any disclaimer, the term of this patent is extended or adjusted under 35 U.S.C. 154(b) by 273 days.

(21) Appl. No.: 16/898,831

(22) Filed: Jun. 11, 2020

(65) Prior Publication Data
US 2020/0396260 A1 Dec. 17, 2020

Related U.S. Application Data

(60) Provisional application No. 62/859,760, filed on Jun. 11, 2019.

(51) Int. Cl.
| | |
|---|---|
| *H04L 9/40* | (2022.01) |
| *H04L 9/06* | (2006.01) |
| *G06K 9/62* | (2022.01) |

(52) U.S. Cl.
CPC .......... *H04L 63/205* (2013.01); *G06K 9/6215* (2013.01); *H04L 9/0643* (2013.01)

(58) Field of Classification Search
CPC . H04L 63/205; H04L 63/0263; H04L 9/0643; G06K 9/6215
See application file for complete search history.

(56) References Cited

U.S. PATENT DOCUMENTS

| | | | |
|---|---|---|---|
| 9,773,107 B2 * | 9/2017 | White | H04L 63/20 |
| 10,154,067 B2 | 12/2018 | Smith et al. | |
| 10,439,985 B2 | 10/2019 | O'Neil | |
| 2019/0005242 A1 * | 1/2019 | Agarwal | G06F 21/564 |
| 2019/0102165 A1 * | 4/2019 | Kim | G06F 16/152 |
| 2019/0349283 A1 | 11/2019 | O'Neil et al. | |
| 2020/0021618 A1 | 1/2020 | Smith et al. | |
| 2020/0374314 A1 * | 11/2020 | Kampanakis | H04L 63/101 |

FOREIGN PATENT DOCUMENTS

WO 2018152303 A1 8/2018

* cited by examiner

*Primary Examiner* — Carl G Colin
*Assistant Examiner* — Andrew Suh
(74) *Attorney, Agent, or Firm* — Clements Bernard Baratta; Lawrence A. Baratta, Jr.; Ryan Odessa

(57) ABSTRACT

A system validates the establishment and/or continuation of a connection between two applications over a network. The system uses network application security rules to allow or disallow connections between the two applications. Those rules include definitions of the source and destination applications to which the rules apply. The system automatically updates the application definitions over time to encompass new versions of the applications covered by the security rules, but without encompassing other applications. The system is then capable of applying the updated rules both to the original applications and to the updated versions of those applications. This process enables the security rules to maintain security over time in a way that is consistent with the original intent of the rules even as applications on the network evolve.

18 Claims, 6 Drawing Sheets

AUTOMATIC NETWORK APPLICATION SECURITY POLICY EXPANSION

CROSS-REFERENCE TO RELATED APPLICATIONS

This application claims priority to U.S. Provisional Application No. 62/859,760, filed Jun. 11, 2019, the contents of which are incorporated by reference herein.

This application is related to the following patent applications, both of which are incorporated by reference herein:
App. Ser. No. 15/883,534, filed on Jan. 30, 2018, entitled, "Network Application Security Policy Enforcement," now U.S. Pat. No. 10,154,067, issued on Dec. 11, 2018 (hereinafter "the Policy Enforcement Patent"); and
U.S. patent application Ser. No. 15/899,453, filed on Feb. 20, 2018 entitled, "Network Application Security Policy Generation," now U.S. Pat. No. 10,439,985, issued on Oct. 8, 2019 (hereinafter "the Policy Generation Patent").

BACKGROUND

Applications connected by network infrastructure communicate with each other in order to share data and perform business operations. The connection between a source application and a destination application is established by the source application, which requests a connection from its Internet Protocol (IP) address to the IP address of the destination application, typically over a specific port. Typically, existing host-based network security technologies, such as personal firewalls, allow or restrict directional access specifically at the egress or ingress point of the communication on the host on which the communication is occurring. For example, the firewall running on the host on which the source application executes typically monitors the outbound connection attempt to the destination IP address, while the firewall running on the host on which the destination application executes typically monitors the inbound connection attempt from the source IP address. Each such security component operates in relative isolation from the other, and generally only has visibility into the network-related information of the other side (e.g., IP address, port, protocol), and not into the identity of the application executing on the other host.

The limited information available to each host in such a communication restricts the types of decisions that existing security technologies can make, and allows for the hosts that are party to communications to be exploited, such as by spoofing their legitimate IP addresses to make or receive unauthorized communications.

The Policy Enforcement Patent describes a system which validates the establishment and/or continuation of a connection between two applications over a network. The validation applies a set of policies which apply to applications. Applying such policies to connections between a pair of applications involves identifying the two applications and determining whether one or more policies applies to the identified applications. Applying the policies in this way may, however, result in a policy not being applied to an application because that application differs in some way from the policy's definition of the application, even though the application's features satisfy the intent of the policy. The policy, in other words, may define the application too narrowly, thereby resulting in false negatives when the policy is applied. One negative consequence of this is that the system may invalidate a connection involving the application even though the application has features which should result in the connection being validated.

SUMMARY

A system validates the establishment and/or continuation of a connection between two applications over a network. The system uses network application security rules to allow or disallow connections between the two applications. Those rules include definitions of the source and destination applications to which the rules apply. The system automatically updates the application definitions over time to encompass new versions of the applications covered by the security rules, but without encompassing other applications. The system is then capable of applying the updated rules both to the original applications and to the updated versions of those applications. This process enables the security rules to maintain security over time in a way that is consistent with the original intent of the rules even as applications on the network evolve.

Other features and advantages of various aspects and embodiments of the present invention will become apparent from the following description and from the claims.

DETAILED DESCRIPTION

Embodiments of the present invention perform symmetrical validation of communication between applications (or services) over a network. Such validation enables an imposter application to be detected and prevented from communicating even if the imposter application communicates, or attempts to communicate, using the same name and communication content as a permitted application. Embodiments of the present invention achieve this result by validating applications using application fingerprints that can distinguish permitted from prohibited applications based on features other than mere application name and communication content. Embodiments of the present invention may define and apply such fingerprints flexibly, so that policies may be enforced not only against exact copies of the applications that were used to generate those policies, but also against reasonable variants of such applications. Additional details and embodiments of the present invention will be described in more detail below.

The term "application," as used herein, includes both applications and services. Therefore, any reference herein to an "application" should be understood to refer to an application or a service.

Figure 1:
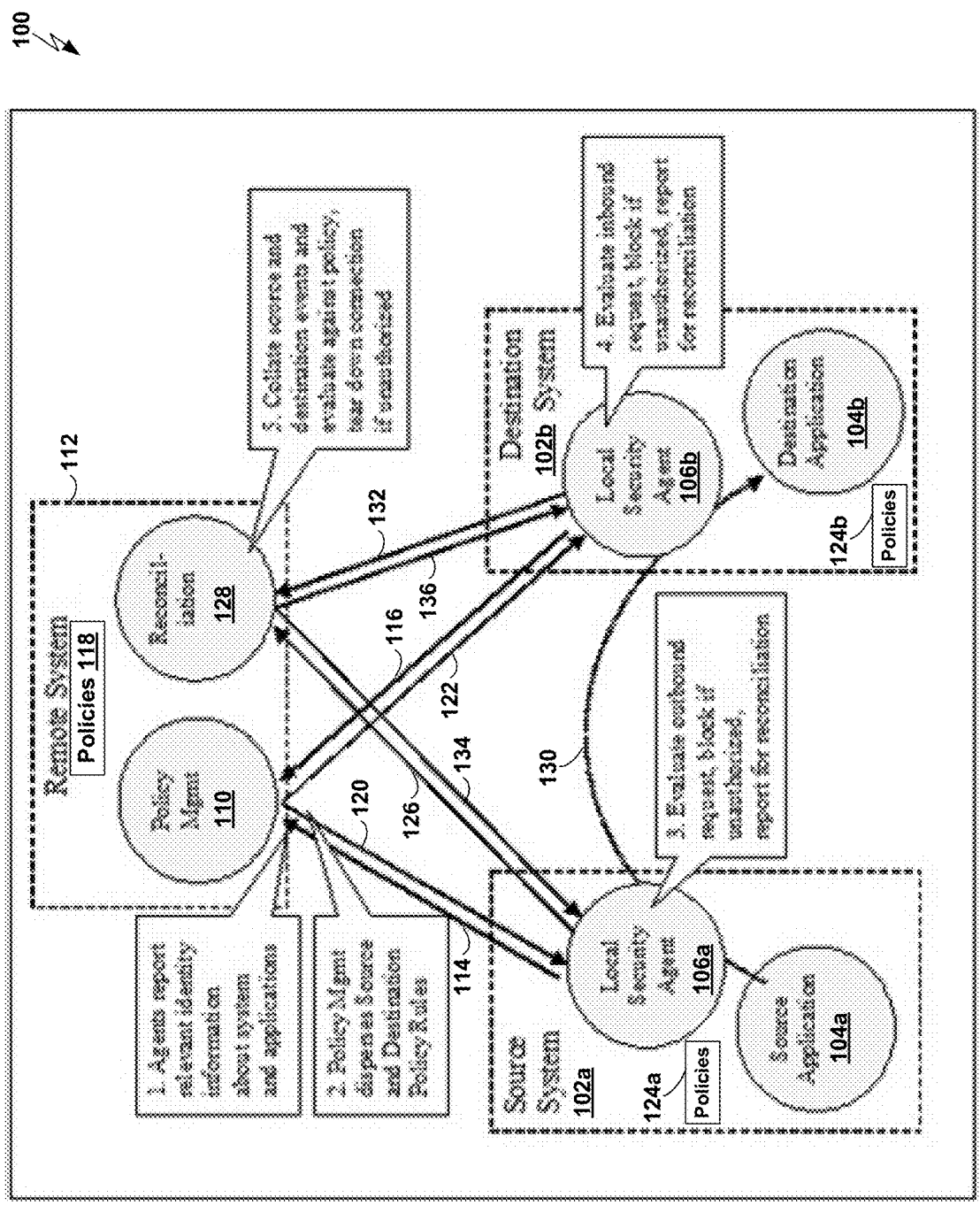
FIG. 1 is a dataflow diagram of a system for performing symmetrical validation of communications between applications over a network according to one embodiment of the present invention.
Figure 2A:
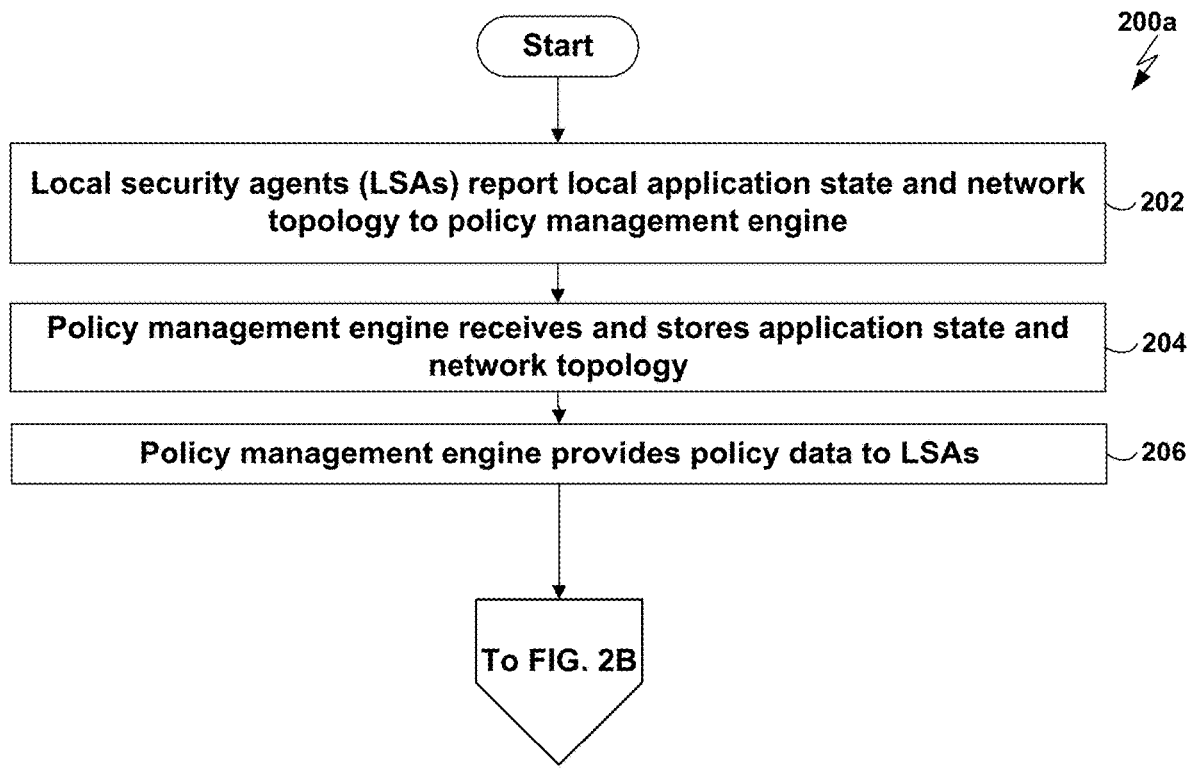
FIGS. 2A-2C are flowcharts of a method for performing the symmetrical validation of FIG. 1 according to one embodiment of the present invention.

Referring to FIG. 1, a dataflow diagram is shown of a system 100 for performing symmetrical validation of communication between applications over a network. Referring to FIG. 2A, a flowchart is shown of a method 200a performed by the policy management agent 110 according to one embodiment of the present invention.

The system 100 includes a source system 102a and a destination system 102b. A "system," as that term is used herein (e.g., the source system 102a and/or destination system 102b), may be any device and/or software operating environment that is addressable over an Internet Protocol (IP) network. For example, each of the source system 102a and the destination system 102b may be any type of physical or virtual computing device, such as a server computer, virtual machine, desktop computer, laptop computer, tablet computer, smartphone, or wearable computer. The source system 102a and the destination system 102b may have the same or different characteristics. For example, the source system 102a may be a smartphone and the destination system 102b may be a server computer. A system (such as the source system 102a and/or destination system 102b) may include one or more other systems, and/or be included within another system. As merely one example, a system may include a plurality of virtual machines, one of which may include the source system 102a and/or destination system 102b.

The source system 102a and destination system 102b are labeled as such in FIG. 1 merely to illustrate a use case in which the source system 102a initiates communication with the destination system 102b. In practice, the source system 102a may initiate one communication with the destination 102b and thereby act as the source for that communication, and the destination system 102b may initiate another communication with the source system 102a and thereby act as the source for that communication. As these examples illustrate, each of the source system 102a and the destination system 102b may engage in multiple communications with each other and with other systems, and may act as either the source or destination in those communications. Furthermore, the system 100 may include additional systems, all of which may perform any of the functions disclosed herein in connection with the source system 102a and the destination system 102b.

The source system 102a includes a source application 104a (which may, for example, be installed and executing on the source system 102a) and the destination system 102b includes a destination application 104b (which may, for example, be installed and executing on the destination system 102b). Each of these applications 104a and 104b may be any kind of application, as that term is used herein. The source application 104a and the destination application 104b may have the same or different characteristics. For example, the source application 104a and destination application 104b may both be the same type of application or even be instances of the same application. As another example, the source application 104a may be a client application and the destination application 104b may be a server application, or vice versa.

An embodiment will now be described for enforcing security policies on a communication that the source system 102a attempts to initiate with the destination system 102b. In this embodiment, the source system 102a includes a local security agent 106a and the destination system 102b includes a local security agent 106b. More generally, a local security agent may be contained within (e.g., installed and executing on) any system that executes one or more applications to which the security techniques disclosed herein are to be applied. A local security agent may, for example, execute within the same operating system on the same system as the application(s) that the local security agent monitors. Each such local security agent (e.g., the local security agents 106a and 106b) may include any combination of hardware and/or software for performing the functions disclosed herein.

The system 100 also includes a policy management engine 110. The policy management engine may include any combination of hardware and/or software for performing the functions disclosed herein. In the particular embodiment illustrated in FIG. 1, the policy management engine 110 is contained within (e.g., installed and executing on) a remote system 112. The remote system 112 may be any device and/or software application that is addressable over an IP network. For example, the remote system 112 may be any type of computing device, such as a server computer, virtual machine, desktop computer, laptop computer, tablet computer, smartphone, or wearable computer. The remote system 112 and the source and destination systems 102a-b may have the same or different characteristics. For example, the source and destination systems 102a-b may be smartphones and the remote system 112 may be a server computer.

Some or all of the local security agents 106a-b may report the state of the local applications as well as the state of the network on their system to the policy management engine 110 (FIG. 2A, operation 202). For example, in FIG. 1, the local security agent 106a is on the same system as and monitors the source application 104a. The local security agent 106a may, therefore, obtain state information about the source application 104a and report some or all of that state information, and/or information derived therefrom, to the policy management engine 110. Although in the example of FIG. 1 only one source application 104a is shown on the source system 102a, any number of source applications may execute on the source system 102a, and the local security agent 106a may obtain and report state information for some or all of such source applications to the policy management engine 110. The local security agent 106a may also report information about the network configuration on source system 102a that will help the policy management engine 110 identify system 102a to other systems independent of the applications that may be executing. The local security agent 106a may also report information about the system network topology of the source system 102a, such as its IP addresses and/or Address Resolution Protocol (ARP) cache. All such reporting is represented by communication 114 in FIG. 1. Such communication 114 may be implemented in any of a variety of ways, such as by the local security agent 106a transmitting (e.g., via IP and/or another network communication protocol) one or more messages containing the obtained application state and network configuration information to the policy management engine 110.

Similarly, the local security agent 106b on the destination system 102b may obtain and transmit state information for the destination application 104b (and for any other applications executing on the destination system 102b) and for the network configuration information of destination system 102b and transmit such information via communication 116 to the policy management engine 110 in any of the ways disclosed above in connection with the local security agent 106a, the source system 102a, the source application 104a, and the communication 114.

The policy management engine 110 may receive the transmitted state information 114 and 116 and store some or all of it in any suitable form (FIG. 2A, operation 204). As described above, such state information may include both application state information and network topology information (e.g., addresses, listening ports, broadcast zones). The policy management engine 110 may, for example, store such state information 114 and 116 in a log (e.g., database) of state information received from one or more local security agents (e.g., local security agents 106a-b) over time. Such a log may include, for each unit of state information received, an identifier of the system (e.g., source system 102a or destination system 102b) from which the state information was received. In this way, the policy management engine 110 may build and maintain a record of application state and network configuration information from various systems over time.

The policy management engine 110 may include or otherwise have access to a set of policies 118, which may be stored in the remote system 112. In general, each of the policies 118 specifies both a source application and a destination application, and indicates that the source application is authorized (or not authorized) to communicate with the destination application. A policy may specify, for the source and/or destination application, any number of additional attributes of the source and/or destination application, such as any one or more of the following, in any combination: user(s) who are executing the application (identified, e.g., by username, group membership, or other identifier), system(s), network subnet, and time(s). A policy may identify its associated source and/or destination application using an application fingerprint, which may include or otherwise specify one or more key-value pairs that define the application, such as its name and any other attribute(s) which may be used to authenticate the validity and identity of an application. An application fingerprint may, for example, include any one or more of the following key-value pairs in any combination: file name, file path, file size, file type, file version, cryptographic (e.g., SHA-256) hash of contents, and digital code signing certificates associated with the application. A policy may include other information for its associated source and/or destination application, such as the IP address and port used by the application to communicate, whether or not such information is used to define the application.

As described above, a policy may include an application fingerprint for a source application and an application fingerprint for a destination application. As will be described in more detail below, applying the policies 118 to a particular communication between a particular source application and a particular destination application involves determining whether the source application matches the policy's source application fingerprint and whether the destination application matches the policy's destination application fingerprint. If, for example, the source application is identical to the source application that was used to generate the source application fingerprint in the policy, then, when an attempt is made to apply the policy, embodiments of the present invention will determine that the source application matches the policy's source application fingerprint.

Consider, however, a situation in which a policy's source application fingerprint was created based on the features of a particular version of a source application, and in which a new version of that source application is installed on the same source system as the original version of the source application. The new version of the source application may have some features which differ from those of the original version of the source application. As a result, if the policy's source application fingerprint is defined and/or applied too rigidly, such as if it is applied to result in a match only if the new version of the source application is identical in all ways to the original version of the source application, then an attempt to apply the policy to the new version of the source application will conclude that the new version of the source application does not match the policy's source application fingerprint. This may be undesirable because, for example, the new version of the source application may retain some or all of the features of the original version of the source application which made the policy applicable to the source application.

There are many other ways in which a particular instance of a source application may differ from the instance of the source application that was the basis for the source application's fingerprint in a particular policy. For example, a source application may be recompiled for execution on a different platform than the instance of the source application that was the basis for the source application's fingerprint in a particular policy. In this case, it is desirable for the policy to continue to be applicable to the new instance of the source application, because from a security perspective that new instance retains all of the features that caused the policy to be applicable to the original instance of the source application. The considerations described above apply equally to destination applications.

As these examples illustrate, it is desirable to define and/or apply an application fingerprint flexibly enough to enable that application fingerprint to be considered to be a match against a variety of instances of an application, even if those instances are not identical to each other. On the other hand, the application fingerprint should not be defined and/or applied so flexibly that it allows significantly different applications to be considered to be matches for the application fingerprint, and thereby evade the security protections afforded by the policy that contains the application fingerprint.

Embodiments of the present invention address this problem by generalizing the definition of "application" that is implemented in an application fingerprint in a security policy of the kind described herein, such as any of the security policies 118. This generalization enables an application fingerprint, which was generated based on features of a specific instance of an application, to encompass (e.g., treated as matching) new versions of that application, but not to encompass (e.g., not treated as matching) other applications. As will be described in more detail below, embodiments of the present invention achieve this beneficial result using both static features of the application and a statistical analysis of similarity, in order to determine whether a previously unseen application should be allowed under policies generated based on another application (or another group of similar applications). This capability advantageously provides the policies 118 with much greater adaptability and thereby enables security to be maintained even in the face of the inevitable changes that will occur in a network, its hosts, and its applications.

The policy management engine 110 provides, to one or more systems in the system 100 (e.g., the source system 102a and destination system 102b), policy data, obtained and/or derived from the policies, representing some or all of the policies that are relevant to the system to which the policy data is transmitted, which may include translating applications into IP address/port combinations (FIG. 2A, operation 206). For example, the policy management engine 110 may identify a subset of the policies 118 that are relevant to the source system 102a and transmit a communication 120 representing the identified subset of policies to the source system 102a. The source system 114a may receive the communication 120 and store source system policy data 124a, representing the received policies, in the source system 102a. Similarly, the policy management engine 110 may identify a subset of the policies 118 that are relevant to the destination system 102b and transmit a communication 122 representing the identified subset of policies to the destination system 102b. The destination system 114b may receive the communication 122 and store destination system policy data 124b, representing the received policies, in the destination system 102b.

The policy management engine 110 may identify the subset of the policies 118 that are relevant to a particular system (e.g., the source system 102a and/or the destination system 102b) in any of a variety of ways. For example, the policy management engine 110 may identify a policy as relevant to a system if the policy refers to an IP address of the system or an application that is installed and/or executing on the system. When the policy management engine 110 determines whether a policy refers to a particular application, the policy management engine 110 may use the broader definition of "application" used herein, and thereby determine that a policy refers to a particular application that is installed and/or executing on a system if that application or an application that has a similarity relation to that application is installed and/or executing on the system. This function may be performed using a "similarity set" for the application of the kind described in more detail below.

The policy management engine 110 may extract the policy data that is relevant to the systems 102a and 102b and transmit the resulting policy data communications 120 and 122 in response to any of a variety of triggers. For example, the policy management engine 110 may extract and transmit relevant policy data (in the form of instances of the communications 120 and 122) to the systems 102a and 102b:
- periodically (e.g., every second, every minute, or at any scheduled times);
- in response to a change in the master policy data;
- in response to a change in network topology, e.g., an assignment of a network address to one of the systems 102a-b or a change in an assignment of an existing address;
- in response to a new application executing on one of the systems 102a-b;
- in response to an existing application in the system 100 changing or adding a port on which it is listening for connections;
- in response to an unexpected condition on systems 102a-b or other systems in the network.

The policy management engine 110 may only transmit updated policy data to one of the systems 102a and 102b if the updates are relevant to that system. Regardless of the trigger, in response to receiving the relevant policy data 120 and 122, the systems 102a and 102b may update their local policy data 124a and 124b in accordance with the received communications 120 and 122, respectively. Receiving and maintaining updated copies of relevant policy data enables local systems, such as the systems 102a and 102b, to apply the policies that are relevant to them without the need to communicate with a remote system or component, such as the remote system 112 or policy management engine 110.

Before describing the system 100 and methods 200a-c in more detail, it will be useful to note that the system 100 may operate in one of at least three security modes in relation to any particular connection between two applications (e.g., the source application 104a and the destination application 104b):
(1) Optimistic: The connection between the two applications is allowed unless and until the reconciliation engine 128 instructs the agents associated with those applications to terminate the connection due to a policy violation.
(2) Pessimistic: The connection between the two applications is terminated after a specified amount of time has passed if the reconciliation engine 128 does not affirmatively instruct the agents associated with those applications to keep the connection alive.
(3) Blocking: The connection between the two applications is blocked unless and until the reconciliation engine 128 affirmatively instructs the agents associated with those applications to allow the connection.

Note that the system 100 may, but need not, operate in the same security mode for all connections within the system 100. The system 100 may, for example, operate in optimistic security mode for some connections, operate in pessimistic security mode for other connections, and operate in blocking security mode for yet other connections. As yet another example, the system 100 may switch from one mode to another for any given connection or set of connections in response to detected conditions, as will be described in more detail below.

Figure 2B:
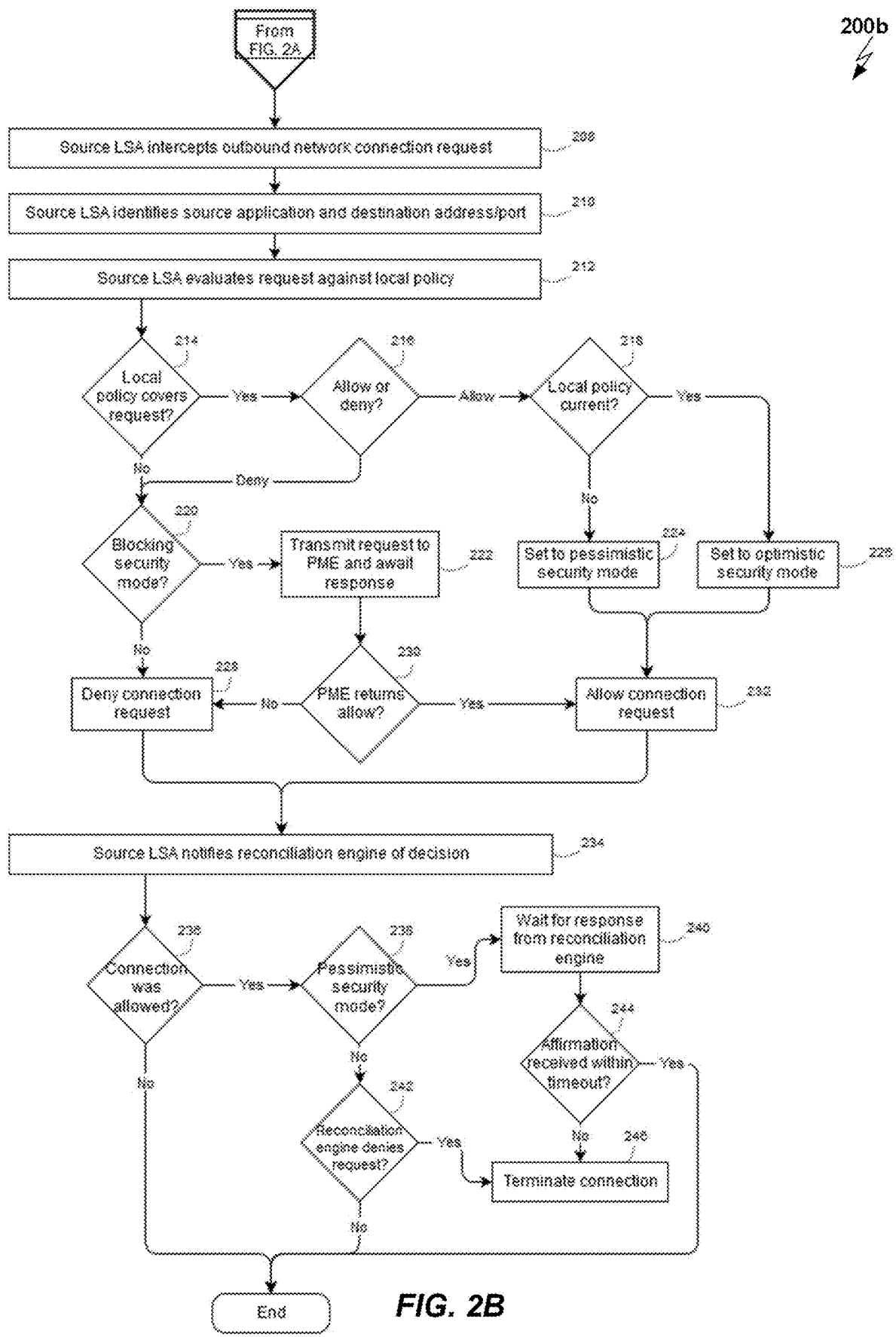

Referring now to FIG. 2B, a flowchart is shown of a method 200b that is performed by the source local security agent 106a in one embodiment of the present invention to process an outgoing connection request. Note that although the method 200b of FIG. 2B may be performed following the method 200a performed by the policy management agent 110 in FIG. 2A, this is merely an example and not a requirement of the present invention. Rather, the method 200b of FIG. 2B (and the method 200c of FIG. 2C) may operate independently of the method 200a of FIG. 2A.

Now consider an example in which the source application 104a makes a network request to communicate with the destination application 104b. Although this particular example will be described in connection with this particular request, the techniques disclosed herein may be applied more generally to any request made by any application to communication with any other application.

The local security agent that is on the same system as the requesting application, which in this example is the local security agent 106a that is on the same system 102a as the requesting application 104a, detects that the requesting application 104a has made the communication request, intercepts the request, and blocks the request from proceeding further at least until the source local security agent 106a has evaluated whether the request matches a local policy (FIG. 2B, operation 208). The local security agent 106a identifies, based on the request, the application 104a that is the source of the request (FIG. 2B, operation 210). The local security agent 106a evaluates the request against the locally stored policies 124a in order to determine whether to allow or deny the request based on any one or more of the following, in any combination: the identity of the source application 104a, the IP address and port of the destination application 104b, some or all of the contents of the request, and the local policy data 124a (FIG. 2B, operation 212).

The local security agent 106a determines, based on its evaluation, whether one of the local policies 124a covers the communication request (FIG. 2B, operation 214). If one of the local policies 124a does cover the request, then the local security agent 106a determines whether the covering policy allows or denies the request (FIG. 2B, operation 216). If the covering policy allows the request, then the local security agent 106a determines whether the covering policy is current (FIG. 2B, operation 218). The local security agent 106a may determine whether the covering policy is current in any of a variety of ways. For example, in certain embodiments, the policy management engine 110 may inform the local security agent 106a that particular policies are current or not current. The local security agent 106a may treat any particular policy as current in response to being informed by the policy management engine 110 that the policy is current, unless and until the policy management engine 110 subsequently informs the local security agent 106a that the policy is no longer current. As another example, the local security agent 106a may convert the status of a policy from current to not current after some predetermined amount of time has passed from when the local security agent 106a previously set the status of the policy to current.

If the covering policy is current, then the local security agent 106a sets its security mode to optimistic mode (FIG. 2B, operation 226); otherwise, the local security agent 106a sets its current security mode to pessimistic security mode (FIG. 2B, operation 224). If the covering policy allows the request, then the local security agent 106a allows the request (FIG. 2B, operation 232), regardless of whether the local policy is current.

If, in operation 232 of FIG. 2B, the local security agent 106a decides to allow the communication request, then, in general, the local security agent 106a allows the communication request to be transmitted to the destination application 104b. Such transmission may occur using traditional techniques. In other words, the local security agent 106a may unblock the communication request and permit it to be transmitted normally.

If, in operation 214, the local security agent 106a determines that none of the local policies 124a covers the request, or, in operation 216, the local security agent 106a determines that the covering policy denies the request, then the local security agent 106a determines whether its current security mode is blocking security mode (FIG. 2B, operation 220). Furthermore, note that the local policies 124a may include a policy which specifically indicates the action to be performed if none of the local policies 124a covers the request. If the local policies 124a include such a policy, then the local security agent 106a may perform the action specified by that policy if the local security agent 106a determines that none of the local policies 124a covers the request.

If the local security agent 106a's current security mode is blocking security mode, then the local security agent 106a transmits the request to the policy management engine 110 and awaits a response from the policy management engine 110 (FIG. 2B, operation 222). The policy management engine 110 then evaluates the request against the central policies 118 and sends a response to the local security agent 106a indicating whether the request should be allowed or denied, based on the central policies 118. The local security agent 106a receives the response 120 from the policy management engine 110 and determines whether the response 120 indicates that the request should be allowed or denied (FIG. 2B, operation 230). If the response 120 from the policy management engine 110 indicates that the request 130 should be allowed, then the local security agent 106a allows the connection request (FIG. 2B, operation 232); otherwise, the local security agent 106a denies the connection request (FIG. 2B, operation 228). The local security agent 106a also denies the connection request (FIG. 2B, operation 228) if, in operation 220, the local security agent 106a determines that its current security mode is not blocking security mode.

Regardless of whether the local security agent 106a allows or denies the request (FIG. 2B, operations 232 or 228), the local security agent 106a notifies a reconciliation engine 128 on the remote system 112 of the decision, such as by transmitting a communication 126 to the reconciliation engine 128 (FIG. 2B, operation 234). The communication 126 may include any of a variety of information, such as data representing one or more of the following: the identity of the source application 104a, the destination IP address and port, and the decision made by the local security agent 106a (e.g., allow or deny). The reconciliation engine 128 may receive and store the communication 126 in any of the ways disclosed herein in connection with the receipt and storage of the communication 114 by the policy management engine 110.

The local security agent 106a may or may not wait to receive a response from the reconciliation engine 128 before proceeding, depending on the local security agent 106a's current security mode. More specifically, the local security agent 106a determines whether it previously denied the connection request 130 in operation 228 or allowed the connection request 130 in operation 232 (FIG. 2B, operation 236). If the connection request 130 was denied, not allowed, the local security agent does not take any further action.

If, instead, the connection request was allowed and was accepted by the destination system 102b, then the local security agent 106a determines whether it is currently operating in pessimistic security mode (FIG. 2B, operation 238). If the local security agent 106a is currently operating in pessimistic security mode, then the local security agent 106a waits to receive a response from the reconciliation engine 128 (FIG. 2B, operation 240). If the local security agent 106a does not receive a response within some predetermined timeout period or receives a response indicating the connection does not reconcile with current policies (FIG. 2B, operation 244), then the local security agent 106a terminates the connection (FIG. 2B, operation 246). If the local security agent 106a receives a response that confirms the connection reconciles with current policy, the local security agent 106a leaves the connection active by not taking any action.

If the local security agent 106a is not currently operating in pessimistic security mode (FIG. 2B, operation 238), then, if the response received by the local security agent 106a from the reconciliation engine 128 denies the request, then the local security agent 106a terminates the connection (FIG. 2B, operation 246). If, in operation 242, the reconciliation engine 128 allows the request, the local security agent 106a leaves the connection active by not taking any action.

Figure 2C:
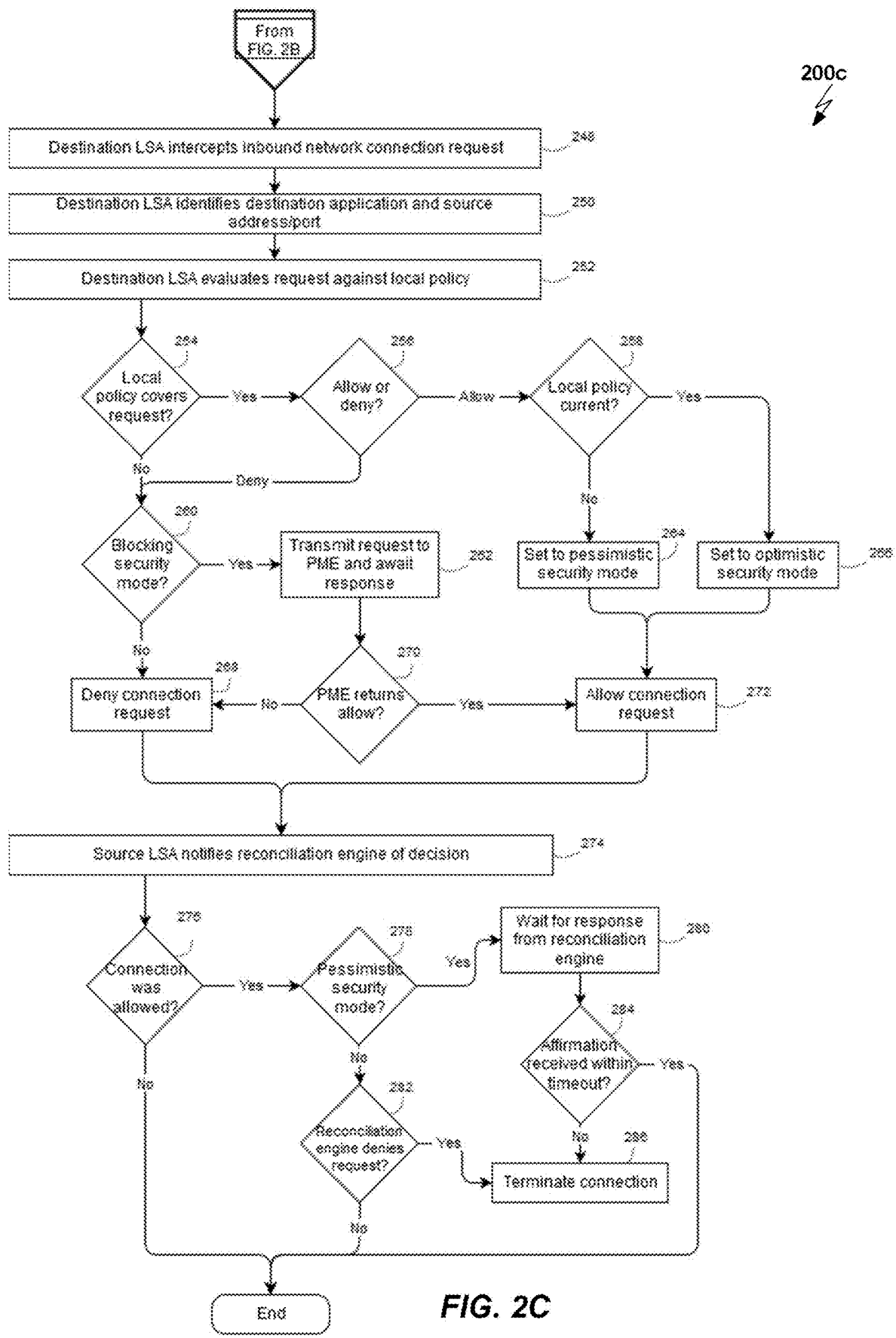

Referring now to FIG. 2C, a flowchart is shown of a method 200c that is performed by the destination local security agent 106b in one embodiment of the present invention to process the incoming connection request 130 from the source application 104a. Note that although the method 200c of FIG. 2C is illustrated as being performed after the method 200b performed by the source local security agent 106a in FIG. 2A, this is merely an example and not a requirement of the present invention. For example, the method 200c of FIG. 2C may begin before the method 200b of FIG. 2B has completed. As a particular example, the method 200c of FIG. 2C may begin after the source local security agent 106a transmits the connection request 130 to the destination system 102b, and before the remainder of the method 200b completes.

The destination local security agent 106b intercepts the inbound connection request 130 transmitted by the source local security agent 106a, and blocks the request from proceeding further at least until the destination local security agent 106b has evaluated whether the request 130 matches a local policy (FIG. 2C, operation 248). The local security agent 10ba identifies, based on the request, the application 104b that is the destination of the request (FIG. 2C, operation 250). The local security agent 106b evaluates the request 130 against the locally stored policies 124*b* in order to determine whether to allow or deny the request 130 based on any one or more of the following, in any combination: the identity of the destination application 104*b*, the IP address and port of the source application 104*a*, some or all of the contents of the request 130, and the local policy data 124*b* (FIG. 2C, operation 252).

The local security agent 106*b* determines, based on its evaluation, whether one of the local policies 124*b* covers the communication request 130 (FIG. 2C, operation 254). If one of the local policies 124*b* does cover the request, then the local security agent 106*b* determines whether the covering policy allows or denies the request (FIG. 2C, operation 256). If the covering policy allows the request, then the local security agent 106*b* determines whether the covering policy is current (FIG. 2C, operation 258). The local security agent 106*b* may determine whether the covering policy is current in any of a variety of ways. For example, in certain embodiments, the policy management engine 110 may inform the local security agent 106*b* that particular policies are current or not current. The local security agent 106*b* may treat any particular policy as current in response to being informed by the policy management engine 110 that the policy is current, unless and until the policy management engine 110 subsequently informs the local security agent 106*b* that the policy is no longer current. As another example, the local security agent 106*b* may convert the status of a policy from current to not current after some predetermined amount of time has passed from when the local security agent 106*b* previously set the status of the policy to current.

If the covering policy is current, then the local security agent 106*b* sets its security mode to optimistic mode (FIG. 2C, operation 266); otherwise, the local security agent 106*b* sets its current security mode to pessimistic security mode (FIG. 2C, operation 264). If the covering policy allows the request 130, then the local security agent 106*b* allows the request 130 (FIG. 2C, operation 272), regardless of whether the local policy is current.

If, in operation 272 of FIG. 2C, the local security agent 106*a* decides to allow the communication request 130, then, in general, the local security agent 106*b* allows the communication request 130 to be provided to the destination application. In other words, the local security agent 106*b* may unblock the communication request 130 so that it may be received by the destination application 104*b*.

If, in operation 254, the local security agent 106*b* determines that none of the local policies 124*b* covers the request 130, or, in operation 256, the local security agent 106*b* determines that the covering policy denies the request 130, then the local security agent 106*b* determines whether its current security mode is blocking security mode (FIG. 2C, operation 260). If the local security agent 106*b*'s current security mode is blocking security mode, then the local security agent 106*b* transmits the request 130 to the policy management engine 110 and awaits a response from the policy management engine 110 (FIG. 2C, operation 262). The policy management engine 110 then evaluates the request 130 against the central policies 118 and sends a response to the local security agent 106*b* indicating whether the request should be allowed or denied, based on the central policies 118. The local security agent 106*b* receives the response 122 from the policy management engine 110 and determines whether the response 122 indicates that the request 130 should be allowed or denied (FIG. 2C, operation 270). If the response 122 from the policy management engine 110 indicates that the request 130 should be allowed, then the local security agent 106*b* allows the connection request 130 (FIG. 2C, operation 272); otherwise, the local security agent 106*b* denies the connection request 130 (FIG. 2C, operation 268). The local security agent 106*b* also denies the connection request 130 (FIG. 2C, operation 268) if, in operation 260, the local security agent 106*b* determines that its current security mode is not blocking security mode.

Regardless of whether the local security agent 106*b* allows or denies the request 130 (FIG. 2B, operations 272 or 268), the local security agent 106*b* notifies the reconciliation engine 128 on the remote system 112 of the decision, such as by transmitting a communication 132 to the reconciliation engine 128 (FIG. 2C, operation 274). The communication 132 may include any of a variety of information, such as data representing one or more of the following: the identity of the destination application 104*b*, the source IP address and port, and the decision made by the local security agent 106*b* (e.g., allow or deny). The reconciliation engine 128 may receive and store the communication 132 in any of the ways disclosed herein in connection with the receipt and storage of the communication 114 by the policy management engine 110.

The local security agent 106*b* may or may not wait to receive a response from the reconciliation engine 128 before proceeding, depending on the local security agent 106*b*'s current security mode. More specifically, the local security agent 106*b* determines whether it previously denied the connection request 130 in operation 268 or allowed the connection request 130 in operation 272 (FIG. 2C, operation 276). If the connection request 130 was denied, not allowed, the local security agent does not take any further action and the destination application 104*b* does not receive the request.

If, instead, the connection request was allowed and was accepted by the destination application 104*b*, then the local security agent 106*b* determines whether it is currently operating in pessimistic security mode (FIG. 2C, operation 278). If the local security agent 106*b* is currently operating in pessimistic security mode, then the local security agent 106*b* waits to receive a response from the reconciliation engine 128 (FIG. 2C, operation 270). If the local security agent 106*b* does not receive a response within some predetermined timeout period or receives a response indicating the connection does not reconcile with current policies (FIG. 2C, operation 274), then the local security agent 106*b* terminates the connection (FIG. 2C, operation 266). If the local security agent 106*b* receives a response that confirms the connection reconciles with current policy, the local security agent 106*b* leaves the connection active by not taking any action.

If the local security agent 106*b* is not currently operating in pessimistic security mode (FIG. 2C, operation 278), then, if the response 136 received by the local security agent 106*b* from the reconciliation engine 128 denies the request, then the local security agent 106*b* terminates the connection (FIG. 2C, operation 286). If, in operation 282, the reconciliation engine 128 allows the request, the local security agent 106*b* leaves the connection active by not taking any action.

As described above, the source and destination local security agents 106*a-b* notify the reconciliation engine 128 of their decisions regarding the connection request, in operation 234 of FIG. 2B and operation 274 of FIG. 2C, respectively. The reconciliation engine 128, in response to receiving the communication 126 from the source local security agent 106*a* and the communication 132 from the destination local security agent 106*b*, collates the data from the two communications 126 and 132 and determines, based on the collated data, whether the collated data indicates that the communication matches any of the policies 118. The reconciliation engine 128 then notifies both the source local security agent 106a and the destination local security agent 106b of its decision, via communications 134 and 136, respectively. The ways in which the source and destination local security agents 106a-b process the communications 134 and 136 are described above in connection with operations 240/242 and 280/282 of FIGS. 2B and 2C, respectively.

The net effect of the method 200 shown in FIGS. 2A-2C is that:
- the source local security agent 106a makes an informed decision about whether to allow or deny the connection request based on the information available to it at the time;
- if the connection is allowed, the destination local security agent 106b makes an informed decision about whether to allow or deny the request based on the information available at the time;
- if both the source and destination local security agents 106a-b allow the communication request, then the reconciliation engine 128 attempts to confirm the decisions of the source and destination local security agents 106a and may either reaffirm those decisions or override them.

A specific example of an application of the system 100 of FIG. 1 and the methods 200a-c of FIGS. 2A-2C will now be described. Assume that the source application 104a is an application named "WebApp" and that the source system 102a has the IP address 192.168.1.1. Further assume that the destination application 104b is an application named "Database" and that the destination system 102b has the IP address 192.168.1.2, and that the "Database" is listening on port 3306. Further assume that the policies 118 include a policy which indicates that the "Database" application is permitted to receive connections from "WebApp" source applications.

The local security agent 106a reports to the policy management engine that it is running application "WebApp" and that its system has an IP address of 192.168.1.1 (communication 114). The local security agent 106b reports to the policy management engine 110 that the application "Database" is running and it is listening on IP address 192.168.1.2, port 3306 (communication 116). The policy management engine 110 informs the source local security agent 106a that application "WebApp" may communicate with 192.168.1.2 over port 3306 (communication 120). The policy management engine 110 informs the destination local security agent 106b that application "Database" may receive communication from 192.168.1.1 (communication 114).

The "WebApp" application initiates a connection request to IP address 192.168.1.2, port 3306. Because this matches a local policy that was received from the policy management engine 110, the local security agent 106a uses the techniques disclosed above to allow the connection request 130 to be transmitted to the destination system 102b and to inform the reconciliation engine that the application named "WebApp" that is executing has initiated a connection request from IP address 192.168.1.1 to IP address 192.168.1.2, port 3306.

On the destination system 102b, IP address 192.168.1.2 on port 3306 receives an inbound request from IP address 192.168.1.1. Because this matches a local policy that was received from the policy management engine 110, the destination local security agent 106b uses the techniques disclosed above to receive the connection request 130, to allow the connection request 130 to be provided to the "Database" application, and to informs the reconciliation engine 128 that the application named "Database" that is executing and listening on IP address 192.168.1.2, port 3306, has received a connection request from IP address 192.168.1.1.

The reconciliation engine 128 collates the information it has received from the source and destination local security agents 106a-b, using any of a variety of data in the received information (e.g., timestamp and/or packet header information). In this example, there are two pieces of information: "'WebApp' requested an outbound connection from 192.168.1.1 to 192.168.1.2:3306" and "'Database' listening on 192.168.1.2:3306 received an inbound connection request from 192.168.1.1". The result of this collation is a conclusion by the reconciliation engine 128 that an application named "WebApp" is attempting to make a connection from 192.168.1.1 to an application named "Database" on 192.168.1.2, port 3306. The reconciliation engine 128 determines that this connection request matches the policy which indicates that the "Database" application is permitted to receive connections from "WebApp" applications and, in response to this determination, sends a positive confirmation back to the source local security agent 106a and the destination local security agent 106b, indicating that the requested connection satisfies the policies 118. In response to receiving these confirmations, the source and destination local security agents 106a-b take no further action.

As described above, the source local security agent 106a may identify the application that is the source of a communication request, such as described in connection with operation 210 of FIG. 2B. Similarly, as described above, the destination local security agent 106b may identify the application that is the destination of a communication request, such as described in connection with operation 250 of FIG. 2C. Such identification of an application may be performed using any of a variety of features of the application, such as any one or more of the features disclosed herein. Some of these features are more stable across different versions of an application than others. Examples of features that tend to be more reliable for identifying an application accurately across different versions of the application are file name and file path.

Some application features are more specific, in that they guarantee that two applications which share the key-value pair of the feature are identical. For example, two applications with the same SHA-256 hash value are almost certainly identical to each other.

Some application features can be faked or lead to incorrect conclusions about whether two applications are the same as or sufficiently similar to each other for security purposes. For example, sometimes significantly different applications will share certain features in common. Conversely, sometimes two applications that should be considered to be the same for security purposes will have different feature values. These circumstances may be the result of coincidence or the result of a malicious attempt to deceive the policies 118 into allowing a malicious application to execute on the network.

Because there is no direct way to unambiguously define "similarity" of application features, embodiments of the present invention use a measure of similarity between applications and then use the features of the applications to check the correctness of that measure.

For example, certain embodiments of the present invention use an algorithm referred to herein as TLSH to measure the similarity between two or more applications. TLSH is an instance of the "locality-sensitive hashing" (LSH) algorithm that has been specialized for use in connection with applications stored in binary files. Implementation details of LSH and TLSH are well-known to those having ordinary skill in the art. Examples of other algorithms in the TLSH class, which may be used by embodiments of the present invention, include SSDEEP, Sdhash, Nilsimsa, Bbhash, and MVHASH-B.

By way of background, a hashing algorithm takes a relatively large amount of information and turns it into a smaller chunk of information, usually of a fixed length (in bytes). If the hashing algorithm is well designed, then if two objects' hash values are the same, then it is almost certain that the two objects are the same. However, most functions do not have a similarity property—in fact, they are designed precisely so that two nearly identical objects will have maximally dissimilar (e.g., uncorrelated) hash values.

In contrast, an LSH algorithm (such as TLSH) is designed so that objects that are similar to each other will have approximately similar hash values. Usually, an LSH hash is a combination of a large number—usually hundreds or more—of not-very-good tests of similarity. For two documents (one of which might be an edited version of the other), each test might be (for example) how many times a particular phrase appeared. Individually, each of these similarity tests isn't very informative. However, the combination of hundreds (or more) of slightly informative similarity tests creates a powerful tool for measuring similarity (if the hash algorithm is designed correctly).

TLSH is an instance of a LSH algorithm, designed to define how different two binary computer files are from each other. A difference of 0 means that the two files are effectively identical to each other (at the resolution of the algorithm). The values output by TLSH have no specific maximum value, but if the output value is greater than 1000, it is clear that the two binary files are completely different from each other.

Embodiments of the present invention may use a TLSH algorithm as a measure of similarity between two applications (stored in binary files). For example, embodiments of the present invention may provide two application binary files as input to a TLSH algorithm, which may then generate an output value based on those two application binary files, where the output value represents a degree of similarity between the two application binary files, as described above. Embodiments of the present invention may then determine, based on the TLSH output value, whether the applications are sufficiently similar to be treated as the "same" application for purposes of the systems and methods disclosed herein.

Embodiments of the present invention may determine whether two applications are the same based on the TLSH output value in any of a variety of ways. The simplest is to define a threshold similarity value: if the TLSH output value that is less than or equal to the threshold similarity value, then the two applications may be treated as the "same" application by the systems and methods disclosed herein. The threshold similarity value may differ depending on the applications being compared. For example, some applications may become more different between updates than others. In other cases, different applications may share source code, and so require a tighter measure of similarity.

Such a threshold value may be identified in any of a variety of ways. For example, in some embodiments of the present invention, the similarities between a large number of application binaries are checked (e.g., using TLSH as described above), where some of the applications have been identified by humans as being the same as each other, and where other applications have been identified by humans as being different from each other. This results in two distributions of TLSH output values: (1) a distribution of output values (similarities) for "same" applications; and (2) a distribution of output values (similarities) for "different" applications. Then, a similarity value is chosen which divides the "same" application similarities from the "different" application similarities as well as possible. This may be achieved, for example, by choosing a value that minimizes a loss function, using any of a variety of techniques that are well-known to those having ordinary skill in the art.

In some cases, the behavior of a particular application is not solely determined by the application itself, but is also determined significantly by code that the application is running. This occurs, for example, in the case of an application that is a runtime environment for Java, Python, and other interpreted or "just-in-time" (JIT) compiled languages. In these cases, using the TLSH output value for the interpreter or JIT compiler does not produce useful results, because such an output value would not reflect the features of the code being executed by the interpreter or JIT compiler. In such cases, embodiments of the present invention may provide the code being executed by the application (e.g., interpreter or JIT compiler) to the TLSH algorithm to produce an output value for that code, rather than an output value for the application. The resulting TLSH output value may then be used in the process described above as the output value of the application.

Figure 3:
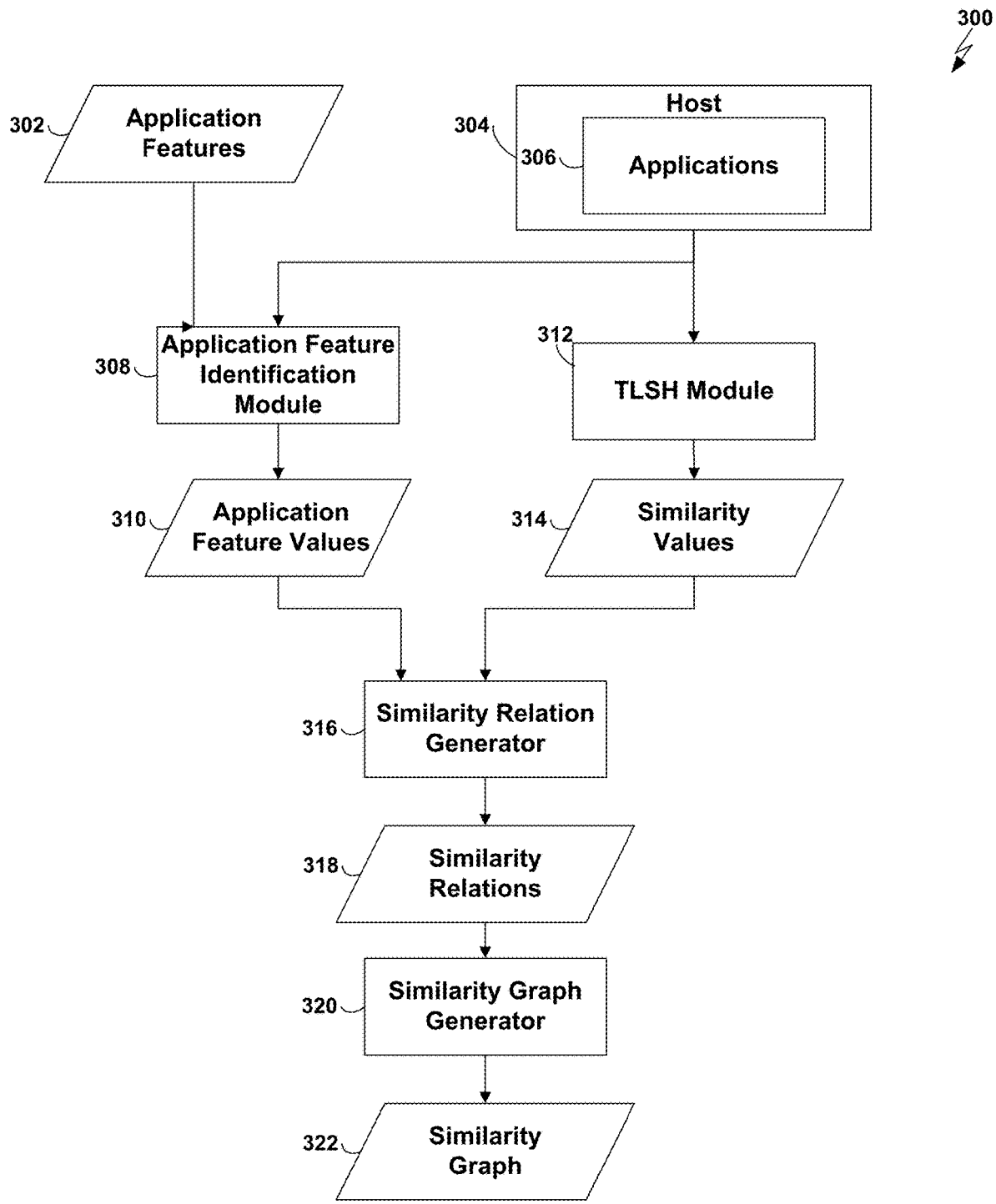
FIG. 3 is a dataflow diagram of a system of expanding the definition of an application according to one embodiment of the present invention.
Figure 4:
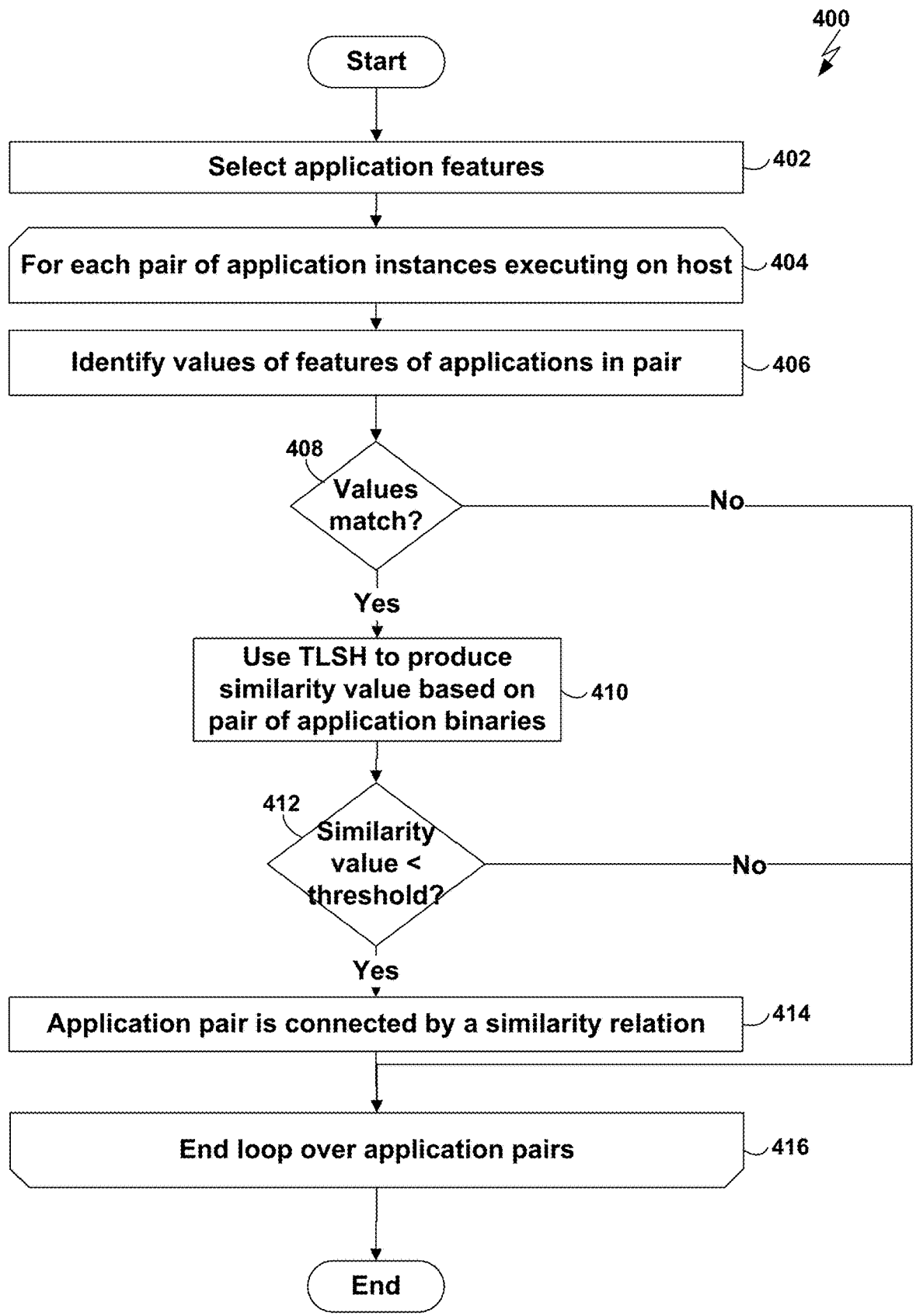
FIG. 4 is a flowchart of a method performed by the system of FIG. 3 according to one embodiment of the present invention.

Referring to FIG. 3, a dataflow diagram is shown of a system 300 for determining whether applications executing on a host are sufficiently similar to each other to be considered to be the "same" as each other. Examples of such a host are the source application 104a and the destination application 104b in FIG. 1. Referring to FIG. 4, a flowchart is shown of a method 400 performed by the system 300 of FIG. 3 according to one embodiment of the present invention.

A set of application features 302 is selected (FIG. 4, operation 402). The application feature set 302 may, for example, contain any one or more of the application features disclosed herein.

A host 304 includes a plurality of applications 306 installed and/or executing on it. The term "host," as used herein, may refer, for example, to any computer, and may include at least one processor and at least one memory. Although only one host 304 is shown in FIG. 3, the techniques disclosed herein may be applied to any number of hosts, each with its own applications executing on it. The system 300 includes an application feature identification module 308, which identifies each pair of application instances installed on the host 304 (FIG. 4, operation 404). For each such pair, the application feature identification module 308 identifies the values 310 of the features in the feature set 302 for each application in the pair (FIG. 4, operation 406), and determines whether all of the feature values for the two applications match each other (FIG. 4, operation 408). The method 400 also provides the binary application files for the two applications in the pair to a TLSH algorithm 312 (or other LSH algorithm), which then produces a similarity value 314 as output (FIG. 4, operation 410). A similarity relation generator 316 determines whether the two algorithms' feature values match each other, and whether the TLSH similarity value is less than a threshold similarity value (MAX DIFFERENCE) (FIG. 4, operation 412). If both of those conditions are satisfied, then the similarity relation generator 316 generates a similarity relation 318 connecting the two applications in the pair (FIG. 4, operation 414). Otherwise, the similarity relation generator does not generate a similarity relation connecting the two applications in the pair. The similarity relations 318 in FIG. 3 may represent similarity relations in any of a variety of ways, such as by only containing similarity relations for application pairs that are connected by similarity relations, or by storing a similarity relations for every application pair but associating a value such as "true" or "false" with each such pair to indicate whether that pair is connected by a similarity relation.

A similarity graph generator 316 creates a similarity graph 322, in which each of the applications 306 installed on the host 304 is represented by a node, and in which any two applications which are connected by a similarity relation are connected by an edge. The relations (edges) are symmetric, in that if application A is connected by a similarity relation to application B, then application B is connected by a similarity relation to application A.

For each application instance A installed on the host, the "similarity set" of application instance A, referred to herein as S(A), is the set consisting of every application instance A' installed on the host for which there is a set of similarity relations that lead from application instance A to application instance A'. In other words, the similarity set is the transitive closure on the similarity graph.

The method 400 may be repeated for a plurality of hosts, such as for the source system 102a and the destination system 102b in FIG. 1, thereby creating a similarity graph for each such host.

Once the similarity graphs have been generated for one or more hosts, such graphs may be used by embodiments of the present invention to automatically expand the set of the application instances that the policies 118 apply to. For example, if a particular one of the policies 118 specifies a particular application A (e.g., a source application or a destination application), then the application fingerprint for application A in that policy may be modified to specify not only application A, but also all applications in the similarity set for application A. This automatic expansion may be performed, for example, for the source application fingerprint in the policy, the destination application fingerprint in the policy, or both. Furthermore, this automatic expansion may be performed for some or all of the policies 118.

Automatically expanding the policies 118 in this way ensures that the policies 118 adapt to network and application changes, while remaining secure.

Although in the embodiment of FIGS. 1 and 2A-2B, the reconciliation engine 128 notifies both the source local security agent 106a and the destination local security agent 106b, via the communications 134 and 136, of the reconciliation engine 128's policy decision in relation to the request 130, alternatively the reconciliation engine 128 may only notify one of the local security agents 106a and 106b. For example, if the reconciliation engine 128 notifies the source local security agent 106a that the request 130 violates one of the policies 118 either before or after the request 130 has been transmitted to the destination application 104b on the destination system 102b, then the source local security agent 106a may, in response to such a notification, either not provide the request 130 to, or terminate the connection if already established with, the destination system 102b. As a result, it would not be necessary for the reconciliation engine 128 to notify the destination local security agent 106b of the policy violation in order to prevent a connection from being established between the source application 104a and the destination application 104b.

Similarly, if the reconciliation engine 128 notifies the destination local security agent 106b that the request 130 violates one of the policies 118, even after the source local security agent 106a has transmitted the request 130 to the destination system 102b, then the destination local security agent 106b may, in response to such a notification, either deny the request 130 and not provide the request 130 to the destination application 104b, or terminate the connection if it has already been allowed. As a result, it would not be necessary for the reconciliation engine 128 to notify the source local security agent 106a of the policy violation in order to prevent a connection from being established between the source application 104a and the destination application 104b.

Furthermore, although both the source system 102a and the destination system 102b in FIG. 1 have their own local security agents 106a and 106b, respectively, this is merely an example and does not constitute a limitation of the present invention. Alternatively, for example, only one of the two systems 102a and 102b may have a local security agent. As particular examples, the source system 102a may have its local security agent 106a, while the destination system 102b may omit the local security agent 106b. Conversely, the destination system 102b may have its local security agent 106b, while the source system 102a may omit its local security agent 106a. Although in these embodiments only one of the two systems 102a and 102b, and the reconciliation engine 128, may validate the communication request against the central policies 118 and one of the local policies 124a and 124b, such embodiments still provide the benefit of some validation, even if less than in the full system 100 employing three-part validation shown in FIG. 1.

Although the policy management engine 110 is shown in FIG. 1 as being separate and remote from the source system 102a and the destination system 102b, this is merely an example and not a limitation of the present invention. More generally, the policy management engine 110 may be implemented in any one or more of the following ways, in any combination:

as a single component, located remotely from and network-accessible to, the source system 102a and destination system 102b, as shown in FIG. 1;

as a plurality of components which are partially or entirely redundant, located remotely from and network-accessible to, the source system 102a and destination system 102b;

as a single component located within one of the source and destination systems 102a and 102b, respectively, and network-accessible to the other systems; and as a plurality of components which are partially or entirely redundant and location within one or more of the source and destination systems 102a and 102b, and optionally network-accessible to the other systems.

Similarly, although the reconciliation engine 128 is shown in FIG. 1 as being separate and remote from the source system 102a and the destination system 102b, this is merely an example and not a limitation of the present invention. More generally, the reconciliation engine 128 may be implemented in any of the ways described above in connection with the policy management engine 110.

Although the local security agents 106a and 106b are shown in FIG. 1 as being contained solely within the respective source and destination systems 102a and 102b, this is merely an example and not a limitation of the present invention. Each of the local security agents 106a and 106b may perform three functions: (1) gathering information about applications executing on the same system (e.g., applications 104a and 104b) and the listening ports against which these applications may be bound; (2) gathering information about the network addresses available on the same system, and (3) enforcing the local policies 124a and 124b. Any of the local security agents 106a and 106b in the systems 102a and 102b may perform any, but not all of these functions, in which case the function not performed locally by the local security agent may be performed remotely by another component not contained within the same system as the local security agent. As one particular example, the local security agent 106a in the source system 102a may perform the functions of gathering information about applications executing on the source system 102a (e.g., source application 104a) and the network addresses available on the source system, but not perform the function of executing local policies 124a, which may be performed by another component (such as a firewall configured to perform the policy enforcement functions disclosed herein) that is not in the source system 102a. As yet another example, all of the functions of gathering application and network address information and policy enforcement may be performed remotely from the system (e.g., systems 102a and 102b) to which those functions are applied.

The description herein refers to blocking or not allowing network connections to be created, and to terminating existing network connections, in response to determining that a policy would be or has been violated. Such blocking/terminating may be applied to: (1) the specific connection that would violate or has violated a policy; (2) all connections that originate from the same source as a connection that would violate or has violated a policy, and which exist or have been requested at the time the policy violation has been detected; (3) all connections that originate from the same source as a connection that would violate or has violated a policy, including both connections that exist or have been requested at the time the policy violation has been detected, and connections requested in the future (possibly until some time limit has been reached or some other condition has been satisfied); and (4) throttling connections originating from the same source as the connection that has been determined to violate the policy.

Although certain embodiments have been described herein as being applied to a request to establish a network connection (such as the request 130), this is merely an example and not a limitation of the present invention. Alternatively or additionally, embodiments of the present invention may apply the techniques disclosed herein to all content (e.g., every packet) communicated within an existing connection, or to selected content (e.g., periodically sampled packets) within an existing connection.

One of the advantages of embodiments of the present invention is that it may be used to protect against policy violations without requiring alterations to the source application 104a, the destination application 104b, or the network traffic between them (e.g., the communication request 130). This ability simplifies the installation, configuration, and maintenance of the system 100 greatly in comparison to systems which require applications and/or network traffic to be modified in order to detect policy violations.

Another advantage of embodiments of the present invention is that they have visibility into the network-related information of both the source and destination sides of a network communication, thereby enabling network security policies to be validated based on such information from both sides. This provides significant advantages over prior art systems, which use only information from the source or the destination, and which therefore lack, for example, information about the identity of the application executing on the other side of the communication. Access to information from both sides of network communications enables embodiments of the present invention to identify and prevent violations of network security policies which cannot be identified accurately using prior art techniques that rely solely on information from one side of the communication.

One embodiment of the present invention is directed to a computer-implemented method. The method includes: (1) identifying a plurality of applications that have a similarity relation to a reference application. The reference application may, for example be any application stored on a host, such as any of the applications disclosed herein as a source application or a destination application.

The method may further include: (2) identifying a network security policy, wherein the network security policy specifies the reference application and another application, and indicates that the reference application is authorized to communicate with the other application. Alternatively, the network security policy may indicate that the reference application is not authorized to communicate with the other application.

The method may further include: (3) intercepting a network connection request including a particular application, other than the reference application, in the set of applications. The method further includes: (4) determining, based on the network security policy and the identified plurality of applications, that the network security policy applies to the particular application. The method further includes: (5) determining whether the network security policy covers the connection request.

The network security policy may, for example, specify the reference application as a source application, and the network security policy may reference the other application as a destination application. As a result, the network security policy may indicate that the source application is authorized (or is not authorized) to communicate with the destination application. The network connection request may include an outgoing network connection request from the particular application.

The network security policy may, for example, specify the reference application as a destination application, and the network security policy may reference the other application as a source application. The network connection request may include an incoming network connection request to the particular application.

The method may further include, before (4): (6) modifying the network security policy to produce a modified network security policy, wherein the modified network security policy specifies that the reference application and the plurality of applications are authorized to communicate with the other application. In this case, (4) may include determining, based on the modified network security policy, that the modified network security policy applies to the particular application.

In the method, (1) may include: (1)(a) applying an LSH algorithm (e.g., a TLSH algorithm) to binary files for a pair of applications to produce a similarity value; (1)(b) determining that the similarity value satisfies a similarity criterion; and (1)(c) including the pair of applications within the plurality of applications in response to determining that the similarity value satisfies the similarity criterion.

In the method, (1) may include, for each pair of applications A and B in a superset of the plurality of applications: (1)(a) applying an LSH algorithm (e.g., a TLSH algorithm) to binary files for the pair of applications A and B to produce a similarity value for the pair of applications A and B; (1)(b) determining whether the similarity value satisfies a similarity criterion; (1)(c) if the similarity value is determined to satisfy the similarity criterion, then including the pair of applications A and B in the plurality of applications; and (1)(d) if the similarity value is not determined to satisfy the similarity criterion, then not including the pair of applications A and B in the plurality of applications.

The method may further include: (6) in response to determining that the network security policy covers the connection request, determining whether the network security policy allows the network connection request. The method may further include: (7) in response to determining that the network security policy allows the network connection request. Alternatively, the method may further include: (7) in response to determining that the network security policy does not allow the network connection request, denying the network connection request.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Any of the functions disclosed herein may be implemented using means for performing those functions. Such means include, but are not limited to, any of the components disclosed herein, such as the computer-related components described below.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Embodiments of the present invention include features which are only possible and/or feasible to implement with the use of one or more computers, computer processors, and/or other elements of a computer system. Such features are either impossible or impractical to implement mentally and/or manually. For example, embodiments of the present invention intercept and then may block network connection requests. Such features are applicable only within the context of networked communications and cannot be performed mentally and/or manually.

Any claims herein which affirmatively require a computer, a processor, a memory, or similar computer-related elements, are intended to require such elements, and should not be interpreted as if such elements are not present in or required by such claims. Such claims are not intended, and should not be interpreted, to cover methods and/or systems which lack the recited computer-related elements. For example, any method claim herein which recites that the claimed method is performed by a computer, a processor, a memory, and/or similar computer-related element, is intended to, and should only be interpreted to, encompass methods which are performed by the recited computer-related element(s). Such a method claim should not be interpreted, for example, to encompass a method that is performed mentally or by hand (e.g., using pencil and paper). Similarly, any product claim herein which recites that the claimed product includes a computer, a processor, a memory, and/or similar computer-related element, is intended to, and should only be interpreted to, encompass products which include the recited computer-related element(s). Such a product claim should not be interpreted, for example, to encompass a product that does not include the recited computer-related element(s).

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

What is claimed is:

1. A method performed by at least one computer processor executing computer program instructions stored on at least one non-transitory computer-readable medium, the method comprising:
   (1) identifying a plurality of applications that have a similarity relation to a reference application;
      (1)(a) applying an LSH algorithm to binary files for a pair of applications to produce a similarity value;
      (1)(b) determining that the similarity value satisfies a similarity criterion; and
      (1)(c) including the pair of applications within the plurality of applications in response to determining that the similarity value satisfies the similarity criterion;

(2) identifying a network security policy, wherein the network security policy specifies the reference application and another application, and indicates that the reference application is authorized to communicate with the other application;
(3) intercepting a network connection request including a particular application, other than the reference application, in the set of applications;
(4) determining, based on the network security policy and the identified plurality of applications, that the network security policy applies to the particular application; and
(5) determining whether the network security policy covers the connection request.

2. The method of claim 1, wherein the network security policy specifies the reference application as a source application, wherein the network security policy references the other application as a destination application, and wherein the network connection request comprises an outgoing network connection request from the particular application.

3. The method of claim 1, wherein the network security policy specifies the reference application as a destination application, wherein the network security policy references the other application as a source application, and wherein the network connection request comprises an incoming network connection request to the particular application.

4. The method of claim 1, further comprising, before (4):
(6) modifying the network security policy to produce a modified network security policy, wherein the modified network security policy specifies that the reference application and the plurality of applications are authorized to communicate with the other application, and wherein (4) comprises determining, based on the modified network security policy, that the modified network security policy applies to the particular application.

5. The method of claim 1, wherein the LSH algorithm comprises a TLSH algorithm.

6. The method of claim 1, wherein (1) comprises, for each pair of applications A and B in a superset of the plurality of applications:
(1)(a) applying the LSH algorithm to binary files for the pair of applications A and B to produce the similarity value for the pair of applications A and B;
(1)(b) determining whether the similarity value satisfies a similarity criterion;
(1)(c) if the similarity value is determined to satisfy the similarity criterion, then including the pair of applications A and B in the plurality of applications; and
(1)(d) if the similarity value is not determined to satisfy the similarity criterion, then not including the pair of applications A and B in the plurality of applications.

7. The method of claim 6, wherein the LSH algorithm comprises a TLSH algorithm.

8. The method of claim 1, further comprising:
(6) in response to determining that the network security policy covers the connection request, determining whether the network security policy allows the network connection request.

9. The method of claim 8, further comprising:
(7) in response to determining that the network security policy allows the network connection request, allowing the network connection request.

10. A system comprising at least one non-transitory computer-readable medium storing computer program instructions executable by at least one computer processor to perform a method, the method comprising:
(1) identifying a plurality of applications that have a similarity relation to a reference application;

(1)(a) applying an LSH algorithm to binary files for a pair of applications to produce a similarity value;
(1)(b) determining that the similarity value satisfies a similarity criterion; and
(1)(c) including the pair of applications within the plurality of applications in response to determining that the similarity value satisfies the similarity criterion;
(2) identifying a network security policy, wherein the network security policy specifies the reference application and another application, and indicates that the reference application is authorized to communicate with the other application;
(3) intercepting a network connection request including a particular application, other than the reference application, in the set of applications;
(4) determining, based on the network security policy and the identified plurality of applications, that the network security policy applies to the particular application; and
(5) determining whether the network security policy covers the connection request.

11. The system of claim 10, wherein the network security policy specifies the reference application as a source application, wherein the network security policy references the other application as a destination application, and wherein the network connection request comprises an outgoing network connection request from the particular application.

12. The system of claim 10, wherein the network security policy specifies the reference application as a destination application, wherein the network security policy references the other application as a source application, and wherein the network connection request comprises an incoming network connection request to the particular application.

13. The system of claim 10, wherein the method further comprises, before (4):
(6) modifying the network security policy to produce a modified network security policy, wherein the modified network security policy specifies that the reference application and the plurality of applications are authorized to communicate with the other application, and wherein (4) comprises determining, based on the modified network security policy, that the modified network security policy applies to the particular application.

14. The system of claim 10, wherein the LSH algorithm comprises a TLSH algorithm.

15. The system of claim 10, wherein (1) comprises, for each pair of applications A and B in a superset of the plurality of applications:
(1)(a) applying the LSH algorithm to binary files for the pair of applications A and B to produce the similarity value for the pair of applications A and B;
(1)(b) determining whether the similarity value satisfies a similarity criterion;
(1)(c) if the similarity value is determined to satisfy the similarity criterion, then including the pair of applications A and B in the plurality of applications; and
(1)(d) if the similarity value is not determined to satisfy the similarity criterion, then not including the pair of applications A and B in the plurality of applications.

16. The system of claim 15, wherein the LSH algorithm comprises a TLSH algorithm.

17. The system of claim 10, wherein the method further comprises:
(6) in response to determining that the network security policy covers the connection request, determining whether the network security policy allows the network connection request.

18. The system of claim 17, wherein the method further comprises:
(7) in response to determining that the network security policy allows the network connection request, allowing the network connection request.

\* \* \* \* \*